United States Patent
Li et al.

(10) Patent No.: US 10,312,812 B2
(45) Date of Patent: Jun. 4, 2019

(54) WIDE-RANGE POSITIVE-NEGATIVE ADJUSTABLE HIGH-VOLTAGE DC POWER SUPPLY AND THE CONTROL METHOD THEREOF

(71) Applicant: Huizhou Sanhua Industrial Co., Ltd., Huizhou, Guangdong (CN)

(72) Inventors: Jianming Li, Guangdong (CN); Zheng Liu, Guangdong (CN); Jianping Sun, Guangdong (CN); Chengshun Zhang, Guangdong (CN)

(73) Assignee: Huizhou Sanhua Industrial Co., Ltd., Huizhou (CN)

( * ) Notice: Subject to any disclaimer, the term of this patent is extended or adjusted under 35 U.S.C. 154(b) by 0 days.

(21) Appl. No.: 15/674,551

(22) Filed: Aug. 11, 2017

(65) Prior Publication Data
US 2018/0048231 A1 Feb. 15, 2018

(30) Foreign Application Priority Data
Aug. 11, 2016 (CN) .......................... 2016 1 0656871

(51) Int. Cl.
*H02M 3/158* (2006.01)
*H02M 3/156* (2006.01)
*B41J 29/393* (2006.01)

(52) U.S. Cl.
CPC ......... *H02M 3/1584* (2013.01); *B41J 29/393* (2013.01); *H02M 3/156* (2013.01)

(58) Field of Classification Search
CPC .. H02M 3/1584; H02M 3/158; H02M 3/1582; H02M 3/156; H02M 3/155; H02M 3/157; H02M 3/1563
USPC ................................. 323/271–272, 282–285
See application file for complete search history.

(56) References Cited

U.S. PATENT DOCUMENTS

| 6,815,845 B1* | 11/2004 | McCallum | H02M 7/5387 307/127 |
| 2013/0195497 A1* | 8/2013 | Shimura | G03G 15/80 399/88 |
| 2015/0381026 A1* | 12/2015 | Tournatory | H02M 3/158 323/271 |

FOREIGN PATENT DOCUMENTS

| CN | 102566642 B | 7/2014 |
| CN | 102545633 B | 9/2014 |

* cited by examiner

*Primary Examiner* — Nguyen Tran

(57) ABSTRACT

A wide-range positive-negative adjustable high-voltage DC power supply includes the following components: a high-voltage generator, a negative high-voltage terminal, and a positive high-voltage terminal; a first driving circuit, a first voltage regulating unit, a current detection and amplification circuit, a second driving circuit and a second voltage regulating unit that are connected in turn; and an adjustable high-voltage output terminal; as well as an instruction input terminal, an instruction voltage circuit and an error amplifier that are connected in turn, and a voltage feedback circuit.

8 Claims, 10 Drawing Sheets

WIDE-RANGE POSITIVE-NEGATIVE ADJUSTABLE HIGH-VOLTAGE DC POWER SUPPLY AND THE CONTROL METHOD THEREOF

CROSS-REFERENCE TO RELATED APPLICATION

The present application claims the benefit of Chinese Patent Application No. 201610656871.8 filed on Aug. 11, 2016, the contents of which are hereby incorporated by reference.

FIELD OF THE INVENTION

The present invention relates to the field of low-power electronic high-voltage DC power source, particularly a wide-range positive-negative adjustable high-voltage DC power supply that is applicable to a laser printer and the control method thereof.

BACKGROUND OF THE INVENTION

Laser printers and other electronic equipment need to use an electronic high-voltage DC power supply whose voltage is adjustable in a wide range, with this high-voltage DC power supply typically generated by a controlled electronic high-voltage generator. Many types of laser printers and other equipment need this multi-channel independent adjustable high-voltage DC power supply, which is usually achieved by a plurality of independently controlled electronic high-voltage generators. High-voltage transformers, high-power transistors and other large size, high cost components have to be used in the electronic high-voltage generator, and therefore the multi-channel independent adjustable high-voltage DC power supply composed of a plurality of independent high-voltage generators has the disadvantages of large volume and high cost.

Reference [1] (ZL 201210014420.6 *A High-voltage Voltage Regulating Circuit*) and Reference [2] (ZL 201210014640.9 *A Multi-channel High-voltage Output Circuit Sharing Reference High-voltage Source*) provide a technical solution of generating the multi-channel independent wide-range adjustable high-voltage DC power supply by a common high-voltage generator, which has the outstanding advantages of small size and low cost. In the technical solution of wide-range voltage regulation provided by References [1] and [2], a series voltage regulating link and a parallel voltage regulating link together compose a series-parallel voltage regulator, in which a fixed high-voltage reference source can be used to generate the wide-range adjustable high-voltage output. The multi-channel independent wide-range adjustable high-voltage output can be achieved just through a plurality of series-parallel voltage regulators and a common high-voltage generator.

However, in the technical solution of making the series voltage regulating link and the parallel voltage regulating link coordinate to achieve the high-voltage regulation as disclosed in References [1] and [2], the series voltage regulating link and the parallel voltage regulating link are both directly controlled by a controller, which has a problem that the series voltage regulating link and the parallel voltage regulating link are difficult to have their working ranges accurately adapted to each other. Ideally, the transistor in the parallel voltage regulating link should be cut off when the transistor in the series voltage regulating link is working, and the transistor in the series voltage regulating link should be cut off when the transistor in the parallel voltage regulating link is working, which should be accurately adapted to each other. Due to discreteness and a variety of bias and drift of the parameters of the electronic components, using the technical solutions disclosed in References [1] and [2] is difficult to realize the ideal and accurate adaptation of the working ranges of the series voltage regulating link and the parallel voltage regulating link. If the transistor in the series voltage regulating link and the transistor in the parallel voltage regulating link are working at the same time, which can be called working range overlap of the series voltage regulating link and the parallel voltage regulating link, a loop will be formed in the overlapping region that is invalid for voltage regulation, thereby increasing the burden of the common reference source and additional circuit loss; if the transistor in the series voltage regulating link and the transistor in the parallel voltage regulating link are cut off at the same time, which can be called a neutral region between the working ranges of the series voltage regulating link and the parallel voltage regulating link, the series voltage regulating link and the parallel voltage regulating link both lose the response to the control signal in the neutral region, which will result in a phenomenon of voltage transiently going out of control, thus causing non-smooth or non-linearity problem of the voltage regulation characteristics. In addition, the technical solutions disclosed in References [1] and [2] are only applicable to the adjustment of the single-polarity DC high voltage, and cannot meet the requirements of a lot of laser printers and other equipment for a wide-range positive-negative adjustable high-voltage DC power supply.

SUMMARY OF THE INVENTION

A purpose of the present invention is to provide a wide-range positive-negative adjustable high-voltage DC power supply, so as to overcome the disadvantages and shortcomings of the prior art. By adopting the technical solution provided by the present invention, a pair of positive-negative high-voltage DC power supplies with a fixed voltage value (referred to as a high-voltage reference source) can be used to produce the wide-range positive-negative adjustable DC high-voltage output, and thus a common positive-negative DC high-voltage reference source can be used to produce the multi-channel independent wide-range positive-negative adjustable DC high-voltage output. Besides, in the technical solution provided by the present invention, the two coordinate voltage regulating units can have their working ranges adapted and cooperated automatically and accurately, and avoid such problems as ineffective loop loss and voltage regulation characteristics going out of control in the prior art, thus having a higher work efficiency and more smooth and accurate voltage regulation characteristics.

Another purpose of the present invention is to provide a method of controlling the wide-range positive-negative adjustable high-voltage DC power supply.

The purpose of the present invention is achieved by the following technical solution:

A wide-range positive-negative adjustable high-voltage DC power supply is provided, comprising the following components: a high-voltage generator, a negative high-voltage terminal, a positive high-voltage terminal, a first driving circuit, a first voltage regulating unit, a current detection and amplification circuit, a second driving circuit, a second voltage regulating unit and an adjustable high-voltage output terminal, as well as an instruction input terminal, an instruction voltage circuit, an error amplifier and a voltage feedback circuit; wherein the high-voltage generator is respectively connected to the positive high-voltage terminal and the negative high-voltage terminal, the positive high-voltage terminal is connected to the input terminal of the first voltage regulating unit, the negative high-voltage terminal is connected to the input terminal of the second voltage regulating unit, the output terminal of the first voltage regulating unit is connected to the output terminal of the second voltage regulating unit and then to the adjustable high-voltage output terminal, the output terminal of the first driving circuit is connected to the driving terminal of the first voltage regulating unit, the current detection terminal of the first voltage regulating unit is connected to the detection input terminal of the current detection and amplification circuit, the output terminal of the current detection and amplification circuit is connected to the input terminal of the second driving circuit, and the output terminal of the second driving circuit is connected to the driving terminal of the second voltage regulating unit; the instruction input terminal, the instruction voltage circuit and the error amplifier are connected in turn, wherein the output terminal of the error amplifier is connected to the input terminal of the first driving circuit, the input terminal of the voltage feedback circuit is respectively connected to the output terminal of the first voltage regulating unit and the output terminal of the second voltage regulating unit, and the output terminal of the voltage feedback circuit is connected to the error amplifier.

The first voltage regulating unit comprises m PNP transistors Q1-1, Q1-2, . . . Q1-m, m+1 resistors R1-0, R1-1, R1-2, . . . R1-m, and one Zener diode D1-1; it also comprises an input terminal, an output terminal, a current detection terminal and a driving terminal; wherein m≥1 and m is an integer; collectors and emitters of the m PNP transistors are connected to each other in series in turn, wherein the emitter of the first transistor Q1-1 is connected to the anode of the Zener diode D1-1, the cathode of the Zener diode D1-1 is connected to one electrode of the current detection terminal of the first voltage regulating unit, the other electrode of the current detection terminal is connected to the input terminal of the first voltage regulating unit, one terminal of the resistor R1-0 is connected to one electrode of the driving terminal of the first voltage regulating unit, the other electrode of the driving terminal is connected to the input terminal of the first voltage regulating unit, the other terminal of the resistor R1-0 is connected to the base of the PNP transistor Q1-1, the two terminals of the resistor R1-m are respectively connected to the base and collector of the transistor Q1-m, the collector of the transistor Q1-m is also connected to the output terminal of the first voltage regulating unit, and the remaining m−1 resistors are respectively connected across the bases of the m transistors connected in series in turn.

The second voltage regulating unit comprises n NPN transistors Q2-1, Q2-2, . . . Q2-n, n+1 resistors R2-0, R2-1, R2-2, . . . R2-n, and one Zener diode D2-1; it also comprises an input terminal, an output terminal and a driving terminal; wherein n≥1 and n is an integer; collectors and emitters of the n NPN transistors are connected to each other in series in turn, wherein the emitter of the first transistor Q2-1 is connected to the cathode of the Zener diode D2-1, the anode of the Zener diode D2-1 is connected to the input terminal of the second voltage regulating unit, one terminal of the resistor R2-0 is connected to one electrode of the driving terminal of the second voltage regulating unit, the other electrode of the driving terminal is connected to the input terminal of the second voltage regulating unit, the other terminal of the resistor R2-0 is connected to the base of the NPN transistor Q2-1, the two terminals of the resistor R2-n are respectively connected to the base and collector of the transistor Q2-n, the collector of the transistor Q2-n is also connected to the output terminal of the second voltage regulating unit, and the remaining n−1 resistors are respectively connected across the bases of the n transistors connected in series in turn.

The first driving circuit comprises one transistor Q3-1 and five resistors R3-1, R3-2, . . . R3-5; it also comprises an input terminal and an output terminal; the emitter of the transistor Q3-1 is connected to one terminal of the resistor R3-1, the other terminal of the resistor R3-1 is connected to one electrode of the input terminal of the first driving circuit, the base of the transistor Q3-1 is respectively connected to one terminal of the resistors R3-2 and R3-3, the other terminal of the resistors R3-2 and R3-3 is respectively connected to the two electrodes of the input terminal of the first driving circuit, the collector of the transistor Q3-1 is connected to one terminal of the resistor R3-4, the other terminal of the resistor R3-4 is connected to one electrode of the output terminal of the first driving circuit, and the two terminals of the resistor R3-5 are respectively connected to the two electrodes of the output terminal of the first driving circuit.

The second driving circuit comprises an optocoupler U4-1 and a resistor R4-1; it also comprises an input terminal and an output terminal; the anode of a light-emitting diode in the optocoupler U4-1 is connected to one terminal of the resistor R4-1, the other terminal of the resistor R4-1 is connected to one electrode of the input terminal of the second driving circuit, the cathode of the light emitting diode is connected to the other electrode of the input terminal of the second driving circuit, and the two terminals of a photosensitive tube in the optocoupler U4-1 are respectively connected to the two electrodes of the output terminal of the second driving circuit.

The current detection and amplification circuit comprises a transistor Q5-1 and a resistor R5-1; it also comprises a detection input terminal and an output terminal; wherein the emitter and the base of the transistor Q5-1 are respectively connected to the two electrodes of the detection input terminal of the current detection and amplification circuit, the collector of the transistor Q5-1 is connected to one electrode of the output terminal of the current detection and amplification circuit, the other electrode of the output terminal is connected to a reference voltage point, and the two electrodes of the resistor R5-1 are respectively connected to the base and the emitter of the transistor Q5-1.

The current detection and amplification circuit comprises an optocoupler U5-1 and an amplifier A5-1, as well as a detection input terminal and an output terminal; wherein the two terminals of a light-emitting diode in the optocoupler U5-1 are respectively connected to the two electrodes of the detection input terminal of the current detection and amplification circuit, the two terminals of a photosensitive tube in the optocoupler U5-1 are respectively connected to the two input terminals of the amplifier A5-1, and the two output terminals of the amplifier A5-1 are respectively connected to the two electrodes of the output terminal of the current detection and amplification circuit.

A proportional amplifier composed of an operational amplifier LM324 is used in the amplifier A5-1.

Another purpose of the present invention is achieved by the following technical solution:

A method of controlling the wide-range positive-negative adjustable high-voltage DC power supply is provided, comprising the following steps:

Step 1: The high-voltage generator produces positive and negative high voltages, which are respectively sent to the positive high-voltage terminal and the negative high-voltage terminal, wherein the voltage value of the positive high-voltage terminal is greater than the upper limit value of the output voltage regulation range of the wide-range positive-negative adjustable high-voltage DC power supply, and the voltage value of the negative high-voltage terminal is less than the lower limit value thereof;

step 2: a PWM voltage regulation instruction is inputted by the instruction input terminal;

step 3: the PWM voltage regulation instruction is converted into an instruction voltage by the instruction voltage circuit;

step 4: the error amplifier compares the instruction voltage with the feedback voltage from the voltage feedback circuit and amplifies it, and sends the operation results to the first driving circuit, and the first driving circuit drives the first voltage regulating unit to adjust the voltage;

step 5: the current detection and amplification circuit detects the emitter current of the PNP transistor Q1-1 in the first voltage regulating unit, and amplifies the detection results before sending them into the second driving circuit, and the second driving circuit drives the second voltage regulating unit to participate in the voltage regulation;

wherein the amplification factor of the current detection and amplification circuit should satisfy the following conditions:

if the emitter current of the PNP transistor Q1-1 in the first voltage regulating unit is recorded as I1, which has a maximum value of $I_{1M}$, then:

when $I_1 \geq 0.1 I_{1M}$, the NPN transistor Q2-1 in the second voltage regulating unit is driven to enter an off state;

when $0 < I_1 < 0.1 I_{1M}$, the NPN transistor Q2-1 in the second voltage regulating unit is driven to enter an amplification region to participate in the voltage regulation; and when $I_1 = 0$, the emitter current of the NPN transistor Q2-1 in the second voltage regulating unit is driven to reach its maximum value;

step 6: the output voltage of the wide-range positive-negative adjustable high-voltage DC power supply is sampled and fed back to the error amplifier by the voltage feedback circuit, compared with the instruction voltage, and is used to control the output voltage to meet the instruction requirements after operation by the error amplifier.

Compared with the prior art, the present invention has the following advantages and benefits:

1. By the control method of the present invention, the first voltage regulating unit and the second voltage regulating unit cooperate in a push-pull mode, make automatic voltage-dividing regulation on the fixed positive-negative high-voltage DC power supply, and can thus achieve the wide-range positive-negative continuously adjustable DC high-voltage output with the voltage between the positive high voltage and the negative high voltage, having the advantages of low loss and strong load capacity; in addition, since the second voltage regulating unit is driven in accordance with the operating current of the transistor in the first voltage regulating unit, only when the operating current of the transistor in the first voltage regulating unit is so small to be going to exit from the amplification region into the cutoff region, does the transistor in the second voltage regulating unit enter the amplification region from the cutoff region to continue the voltage regulation; when the transistor in the first voltage regulating unit returns to the amplification region for voltage regulation, the transistor in the second voltage regulating unit automatically enters the cutoff region exiting from the voltage regulation. Thus, it can be ensured that the first voltage regulating unit and the second voltage regulating unit have their working ranges automatically and accurately adapted to each other, avoiding the ineffective loop loss caused by the overlap of the working ranges of the two voltage regulating units or the deterioration of the voltage regulating characteristics and the precision due to the presence of the neutral region between the working ranges of the two voltage regulating units.

2. The present invention provides a wide-range positive-negative adjustable high-voltage DC power supply and the control method thereof, and uses two complementary voltage regulating units to coordinate in a push-pull mode to complete the voltage regulation, providing wide-range voltage adjustment, high precision, positive-negative continuously adjustable DC high-voltage output, high efficiency, strong load capacity and other advantages.

3. The present invention relates two complementary voltage regulating units for voltage regulation to each other by providing a current detection and amplification circuit, together with the appropriate control method, and can ensure that the two complementary push-pull voltage regulating units have their working ranges adapted to each other automatically and accurately, thus effectively avoiding the ineffective loop loss caused by the overlap of the working ranges of the two voltage regulating units or the deterioration of the voltage regulating performance due to the presence of the neutral region between the working ranges.

4. The present invention can effectively prevent the problem that the two voltage regulating units are not fit due to the factors such as discreteness and drift of the parameters of the electronic components, simplify parameter screening of the components and parameter adjustment of the products, and ensure product consistency, temperature stability and long-term stability.

5. By adopting the technical solution provided by the present invention, a common high-voltage generator can be used to provide the positive-negative high-voltage reference source, and a plurality of groups of complementary voltage regulating units can be used to generate the multi-channel independent wide-range positive-negative adjustable high-voltage output.

6. The technical solution of the present invention has strong applicability, simple structure, low cost and easy implementation.

DETAILED DESCRIPTION OF THE EMBODIMENTS

The present invention will be further described below in detail with reference to examples and drawings; however, the embodiments of the present invention are not limited thereto.

EXAMPLE 1

Figure 1:
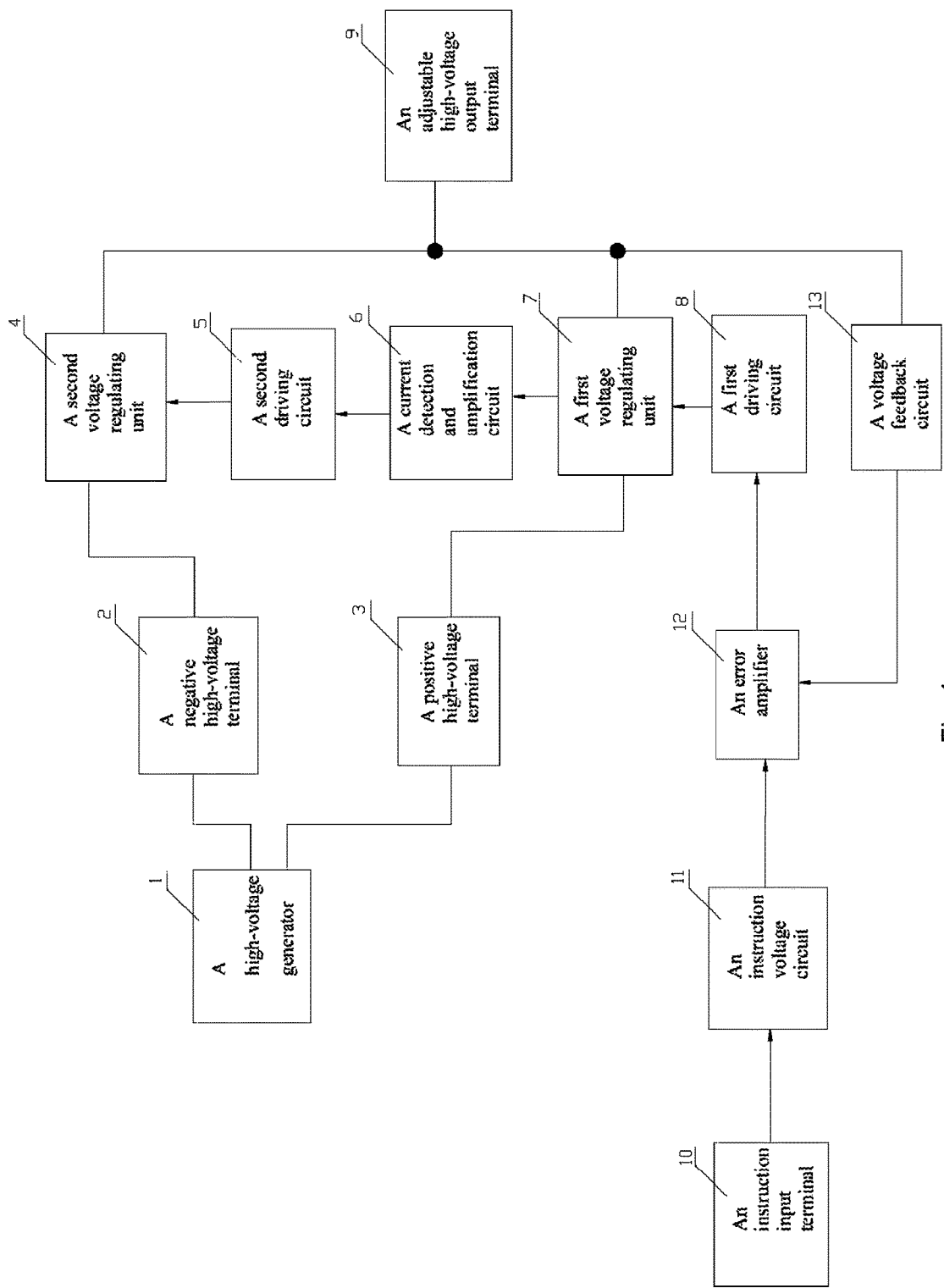
FIG. 1 is a structural schematic view of a wide-range positive-negative adjustable high-voltage DC power supply according to the present invention.

A wide-range positive-negative adjustable high-voltage DC power supply, as shown in FIG. 1, comprises the following components: a high-voltage generator 1, a negative high-voltage terminal 2, a positive high-voltage terminal 3, a first driving circuit 8, a first voltage regulating unit 7, a current detection and amplification circuit 6, a second driving circuit 5, a second voltage regulating unit 4 and an adjustable high-voltage output terminal 9; wherein the high-voltage generator 1 is respectively connected to the positive high-voltage terminal 3 and the negative high-voltage terminal 2, the positive high-voltage terminal 3 is connected to the input terminal of the first voltage regulating unit 7, the negative high-voltage terminal 2 is connected to the input terminal of the second voltage regulating unit 4, the output terminal of the first voltage regulating unit 7 is connected to the output terminal of the second voltage regulating unit 4 and then to the adjustable high-voltage output terminal 9, the output terminal of the first driving circuit 8 is connected to the driving terminal of the first voltage regulating unit 7, the current detection terminal of the first voltage regulating unit 7 is connected to the detection input terminal of the current detection and amplification circuit 6, the output terminal of the current detection and amplification circuit 6 is connected to the input terminal of the second driving circuit 5, and the output terminal of the second driving circuit 5 is connected to the driving terminal of the second voltage regulating unit 4.

Figure 2:
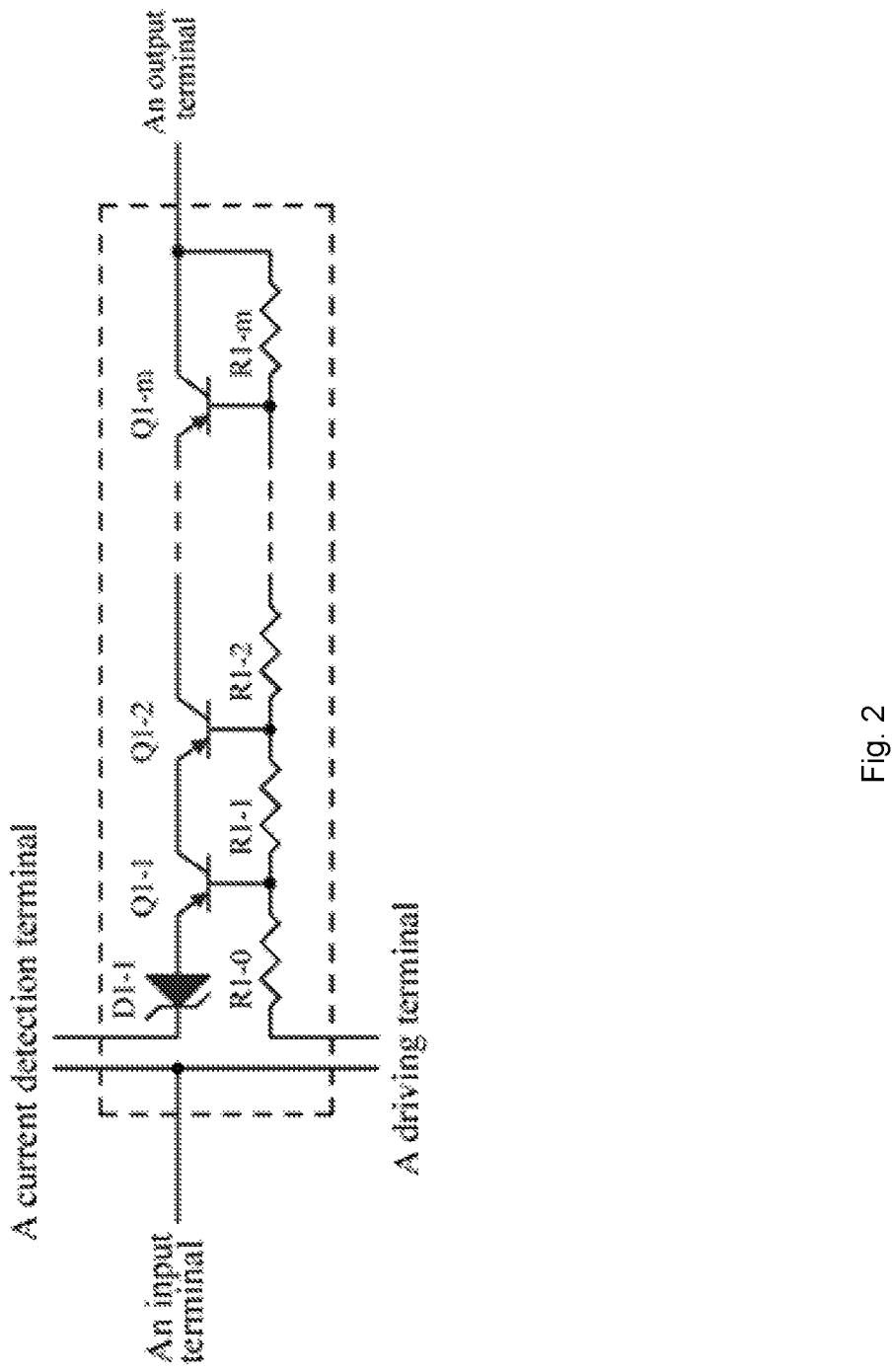
FIG. 2 is a circuit diagram of the first voltage regulating unit of the power supply shown in FIG. 1.

In the wide-range positive-negative adjustable high-voltage DC power supply, as shown in FIG. 2, the first voltage regulating unit comprises m PNP transistors Q1-1, Q1-2, ... Q1-m, with m being an integer greater than or equal to 1, m+1 resistors R1-0, R1-1, R1-2, ... R1-m, and one Zener diode D1-1; collectors and emitters of the m PNP transistors are connected to each other in series in turn, wherein the emitter of the first transistor Q1-1 is connected to the anode of the Zener diode D1-1, the cathode of the Zener diode D1-1 is connected to one electrode of the current detection terminal of the first voltage regulating unit, the other electrode of the current detection terminal is connected to the input terminal of the first voltage regulating unit, one terminal of the resistor R1-0 is connected to one electrode of the driving terminal of the first voltage regulating unit, the other electrode of the driving terminal is connected to the input terminal of the first voltage regulating unit, the other terminal of the resistor R1-0 is connected to the base of the PNP transistor Q1-1, the two terminals of the resistor R1-m are respectively connected to the base and collector of the transistor Q1-m, the collector of the transistor Q1-m is also connected to the output terminal of the first voltage regulating unit, and the remaining m−1 resistors are respectively connected across the bases of the m transistors connected in series in turn.

Figure 3:
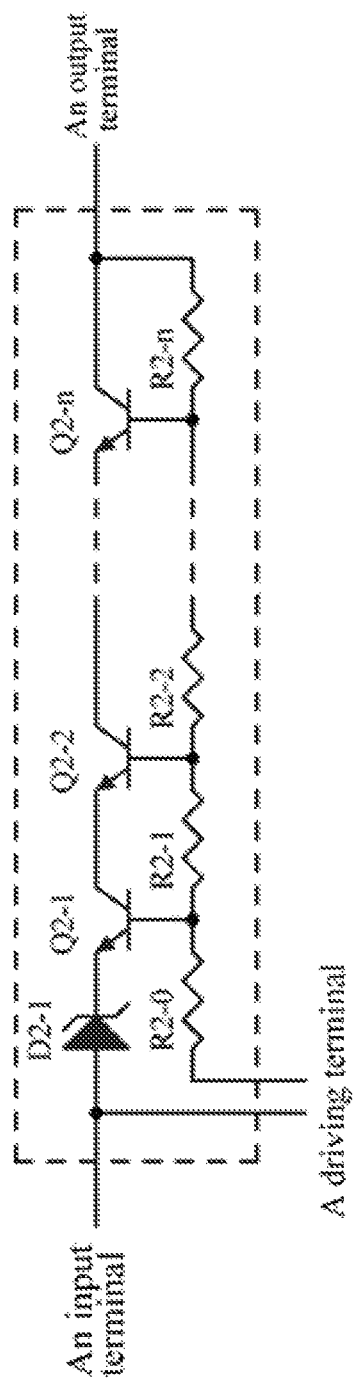
FIG. 3 is a circuit diagram of the second voltage regulating unit of the power supply shown in FIG. 1.

In the wide-range positive-negative adjustable high-voltage DC power supply, as shown in FIG. 3, the second voltage regulating unit comprises n NPN transistors Q2-1, Q2-2, ... Q2-n, with n being an integer greater than or equal to 1, n+1 resistors R2-0, R2-1, R2-2, ... R2-n, and one Zener diode D2-1; collectors and emitters of the n NPN transistors are connected to each other in series in turn, wherein the emitter of the first transistor Q2-1 is connected to the cathode of the Zener diode D2-1, the anode of the Zener diode D2-1 is connected to the input terminal of the second voltage regulating unit, one terminal of the resistor R2-0 is connected to one electrode of the driving terminal of the second voltage regulating unit, the other electrode of the driving terminal is connected to the input terminal of the second voltage regulating unit, the other terminal of the resistor R2-0 is connected to the base of the NPN transistor Q2-1, the two terminals of the resistor R2-n are respectively connected to the base and collector of the transistor Q2-n, the collector of the transistor Q2-n is also connected to the output terminal of the second voltage regulating unit, and the remaining n−1 resistors are respectively connected across the bases of the n transistors connected in series in turn.

Figure 4:
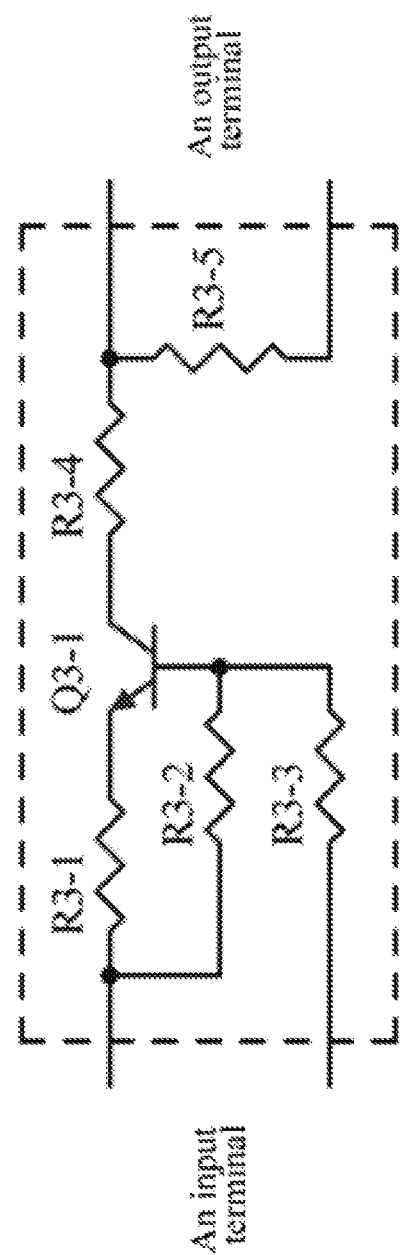
FIG. 4 is a circuit diagram of the first driving circuit of the power supply shown in FIG. 1.

In the wide-range positive-negative adjustable high-voltage DC power supply, as shown in FIG. 4, the first driving circuit comprises one transistor Q3-1 and five resistors R3-1, R3-2, . . . R3-5; the emitter of the transistor Q3-1 is connected to one terminal of the resistor R3-1, the other terminal of the resistor R3-1 is connected to one electrode of the input terminal of the first driving circuit, the base of the transistor Q3-1 is respectively connected to one terminal of the resistors R3-2 and R3-3, the other terminal of the resistors R3-2 and R3-3 is respectively connected to the two electrodes of the input terminal of the first driving circuit, the collector of the transistor Q3-1 is connected to one terminal of the resistor R3-4, the other terminal of the resistor R3-4 is connected to one electrode of the output terminal of the first driving circuit, and the two terminals of the resistor R3-5 are respectively connected to the two electrodes of the output terminal of the first driving circuit.

Figure 5:
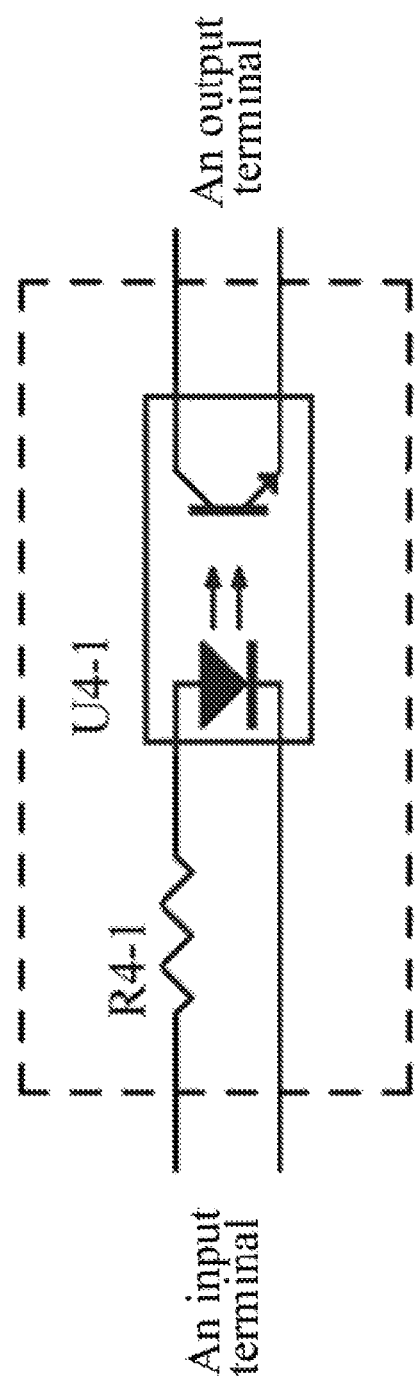
FIG. 5 is a circuit diagram of the second driving circuit of the power supply shown in FIG. 1.

In the wide-range positive-negative adjustable high-voltage DC power supply, as shown in FIG. 5, the second driving circuit comprises an optocoupler U4-1 and a resistor R4-1; the anode of a light-emitting diode in the optocoupler U4-1 is connected to one terminal of the resistor R4-1, the other terminal of the resistor R4-1 is connected to one electrode of the input terminal of the second driving circuit, the cathode of the light emitting diode is connected to the other electrode of the input terminal of the second driving circuit, and the two terminals of a photosensitive tube in the optocoupler U4-1 are respectively connected to the two electrodes of the output terminal of the second driving circuit.

Figure 6:
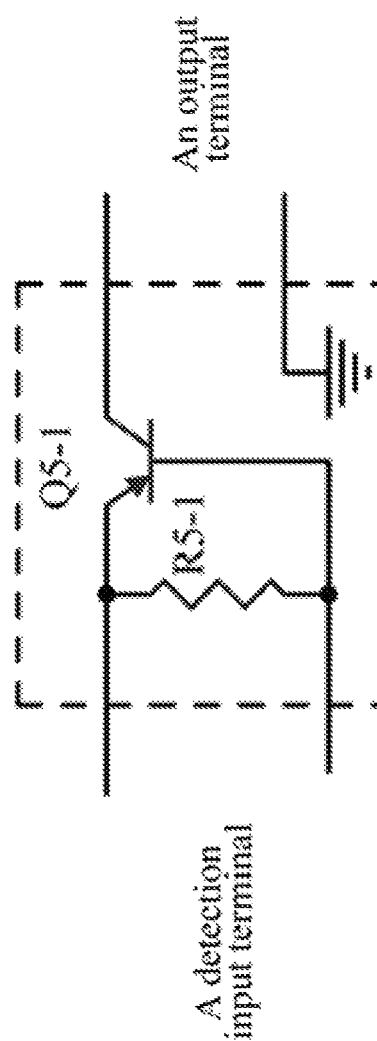
FIG. 6 is a circuit diagram of the current detection and amplification circuit of the power supply shown in FIG. 1.

In the wide-range positive-negative adjustable high-voltage DC power supply, as shown in FIG. 6, the current detection and amplification circuit comprises a transistor Q5-1 and a resistor R5-1; wherein the emitter and the base of the transistor Q5-1 are respectively connected to the two electrodes of the detection input terminal of the current detection and amplification circuit, the collector of the transistor is connected to one electrode of the output terminal of the current detection and amplification circuit, the other electrode of the output terminal is connected to a reference voltage point, and the two electrodes of the resistor R5-1 are respectively connected to the base and the emitter of the transistor Q5-1.

Figure 7:
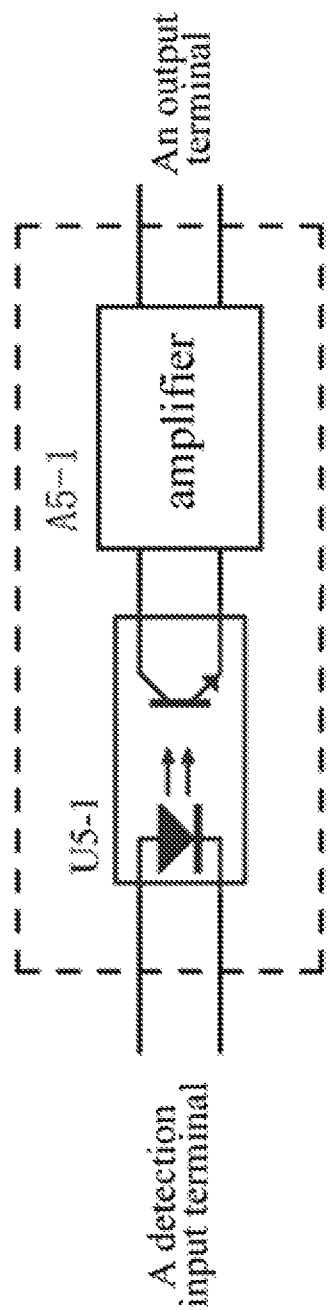
FIG. 7 is a circuit diagram of the current detection and amplification circuit of the power supply shown in FIG. 1.

In the wide-range positive-negative adjustable high-voltage DC power supply, as shown in FIG. 7, the current detection and amplification circuit comprises an optocoupler U5-1 and an amplifier A5-1, the two terminals of a light-emitting diode in the optocoupler U5-1 are respectively connected to the two electrodes of the detection input terminal of the current detection and amplification circuit, the two terminals of a photosensitive tube in the optocoupler U5-1 are respectively connected to the two input terminals of the amplifier A5-1, and the two output terminals of the amplifier A5-1 are respectively connected to the two electrodes of the output terminal of the current detection and amplification circuit; the amplifier A5-1 may be constituted by a known technique, e.g., a proportional amplifier composed of an operational amplifier LM324 can be used.

The wide-range positive-negative adjustable high-voltage DC power supply, as shown in FIG. 1, also comprises an instruction input terminal 10, an instruction voltage circuit 11, an error amplifier 12 and a voltage feedback circuit 13; the instruction input terminal 10 is connected to the input terminal of the instruction voltage circuit 11, the output terminal of the instruction voltage circuit 11 is connected to one input terminal of the error amplifier 12, the other input terminal of the error amplifier 12 is connected to the output terminal of the voltage feedback circuit 13, the output terminal of the error amplifier 12 is connected to the input terminal of the first driving circuit 18, the input terminal of the voltage feedback circuit 13 is connected to the adjustable high-voltage output terminal 9; the high-voltage generator 1, the instruction voltage circuit 11, the error amplifier 12, and the voltage feedback circuit 13 are all constituted by a known technique, e.g., the high-voltage generator can include a high-frequency high-voltage oscillator composed of a high-voltage transformer and a transistor, so as to produce the high-frequency AC high-voltage power supply, and then a positive-negative DC high-voltage power supply is obtained by rectification with the high-frequency rectifier; the instruction voltage circuit may be composed of an RC low-pass filter and a resistor voltage-dividing circuit; a PI regulator composed of the operational amplifier LM324 can be used as the error amplifier; and a suitable resistor voltage-dividing circuit can be used as the voltage feedback circuit.

A method of controlling the wide-range positive-negative adjustable high-voltage DC power supply is provided, comprising the following steps:

Step 1: The high-voltage generator produces positive and negative high voltages, which are respectively sent to the positive high-voltage terminal and the negative high-voltage terminal, wherein the voltage value of the positive high-voltage terminal is greater than the upper limit value of the output voltage regulation range of the wide-range positive-negative adjustable high-voltage DC power supply, and the voltage value of the negative high-voltage terminal is less than the lower limit value thereof;

step 2: a PWM voltage regulation instruction is inputted by the instruction input terminal;

step 3: the PWM voltage regulation instruction is converted into an instruction voltage by the instruction voltage circuit;

step 4: the error amplifier compares the instruction voltage with the feedback voltage from the voltage feedback circuit and amplifies it, and sends the operation results to the first driving circuit, and the first driving circuit drives the first voltage regulating unit to adjust the voltage;

step 5: the current detection and amplification circuit detects the emitter current of the PNP transistor Q1-1 in the first voltage regulating unit, and amplifies the detection results before sending them into the second driving circuit, and the second driving circuit drives the second voltage regulating unit to participate in the voltage regulation;

wherein the amplification factor of the current detection and amplification circuit should satisfy the following conditions:

if the emitter current of the PNP transistor Q1-1 in the first voltage regulating unit is recorded as $I_1$, which has a maximum value of $I_{1M}$, then:

when $I_1 \geq 0.1 I_{1M}$, the NPN transistor Q2-1 in the second voltage regulating unit is driven to enter an off state;

when $0 < I_1 < 0.1 I_{1M}$, the NPN transistor Q2-1 in the second voltage regulating unit is driven to enter an amplification region to participate in the voltage regulation; and when $I_1 = 0$, the emitter current of the NPN transistor Q2-1 in the second voltage regulating unit is driven to reach its maximum value;

step 6: the output voltage of the wide-range positive-negative adjustable high-voltage DC power supply is sampled and fed back to the error amplifier by the voltage feedback circuit, compared with the instruction voltage, and is used to control the output voltage to meet the instruction requirements after operation by the error amplifier.

EXAMPLE 2

Figure 8:
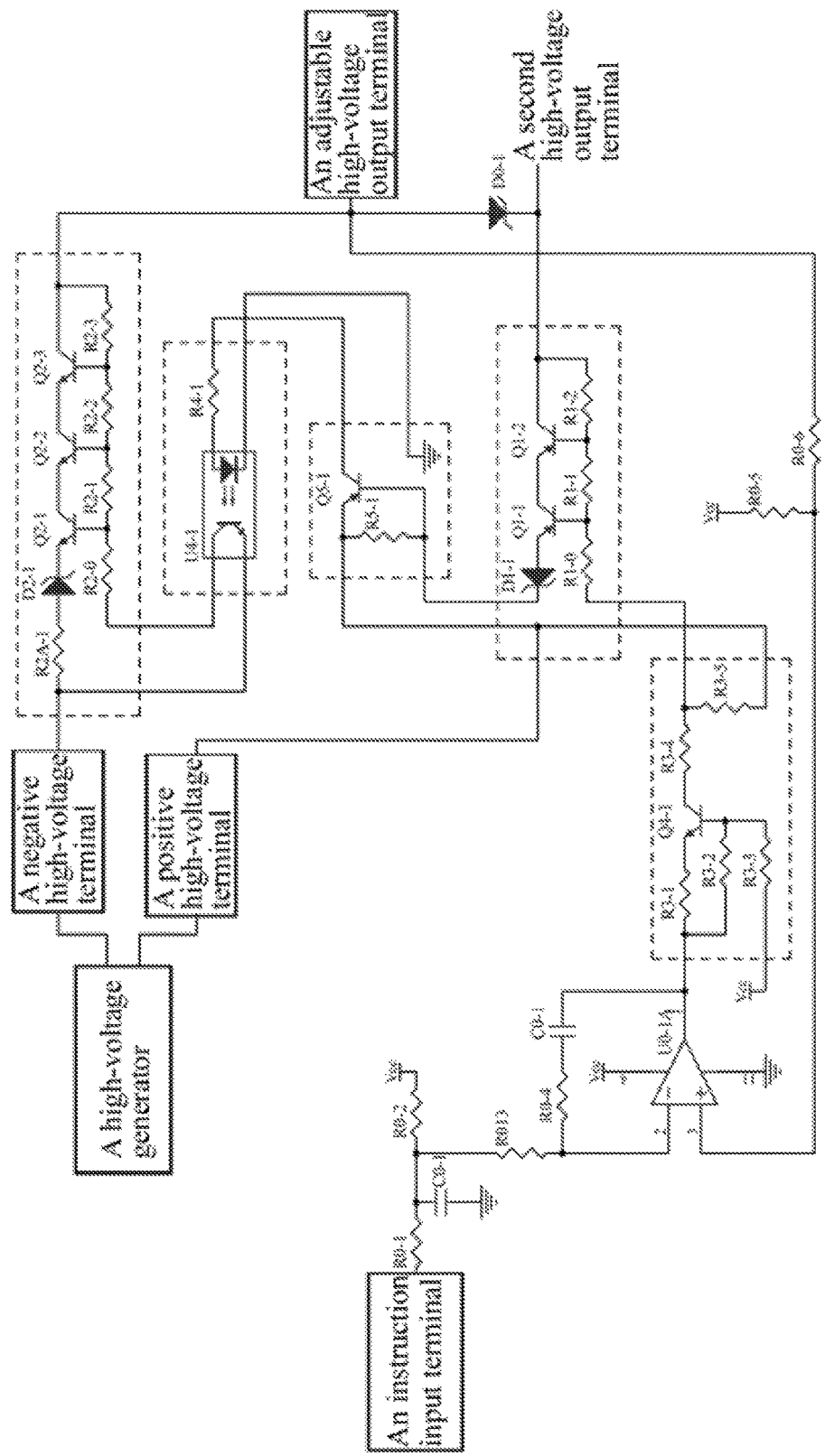
FIG. 8 is a structural schematic view of the wide-range positive-negative adjustable high-voltage DC power supply according to the present invention.

As shown in FIG. 8, in this example, the first voltage regulating unit is composed of two transistors in series, the second voltage regulating unit is composed of three transistors in series, the current detection and amplification circuit adopts the first solution shown in FIG. 4, the instruction voltage circuit is composed of an RC low-pass filter and a resistor voltage-dividing circuit, a PI regulator composed of the operational amplifier LM324 is used as the error amplifier, and the voltage feedback circuit is composed of a resistor voltage-dividing circuit; besides, a Zener diode D0-1 is connected between the output terminals of the first voltage regulating unit and the second voltage regulating unit, so as to add a second high-voltage output terminal having a fixed voltage difference from the voltage value of the adjustable high-voltage output terminal to meet the needs of the application side; a resistor R2A-1 is added to the emitter circuit of the transistor Q2-1 in the second voltage regulating unit to improve the adjustment characteristics of the second voltage regulating unit; the remaining portions are the same as those in Example 1.

EXAMPLE 3

Figure 9:
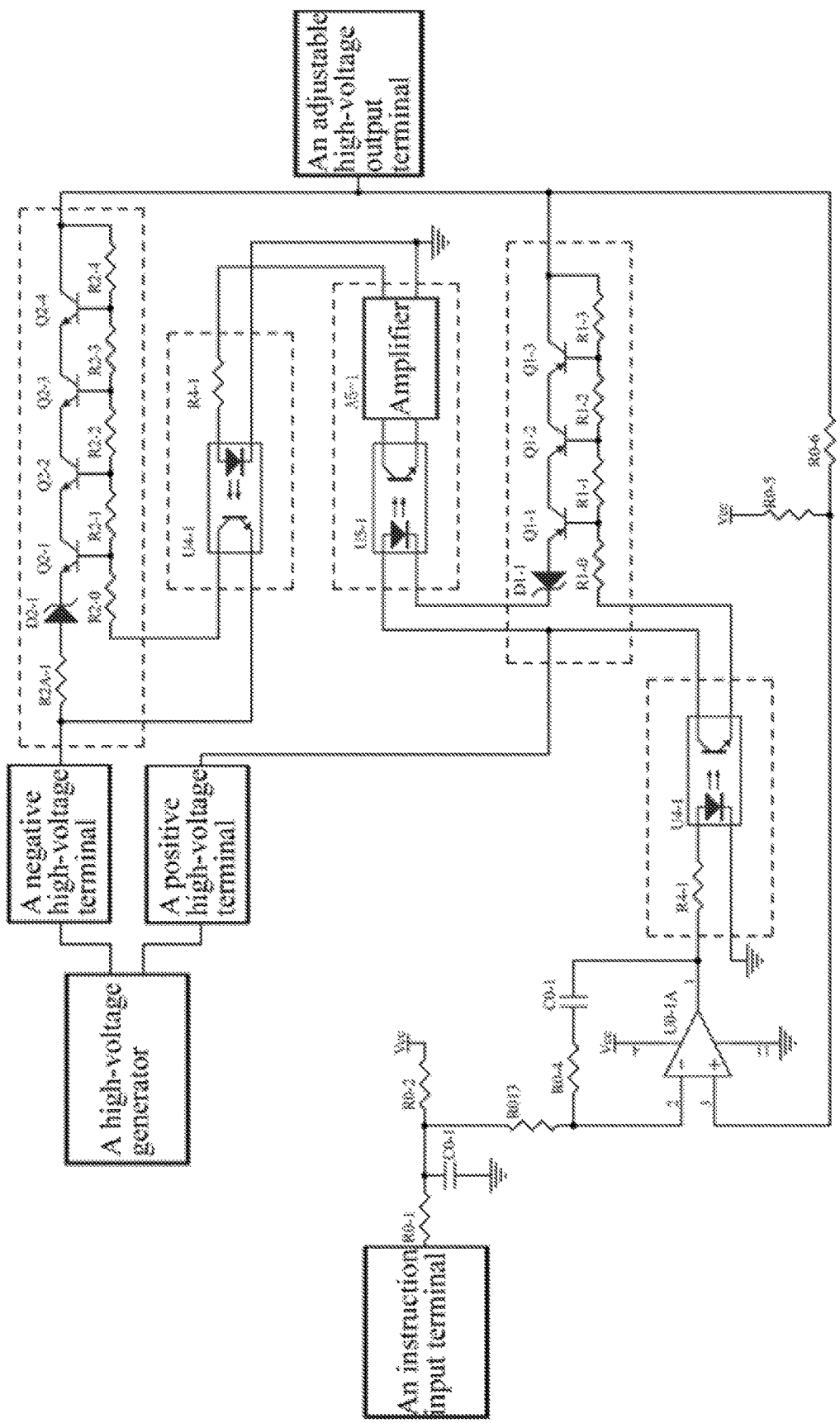
FIG. 9 is a structural schematic view of the wide-range positive-negative adjustable high-voltage DC power supply according to the present invention.

As shown in FIG. 9, in this example, the first voltage regulating unit is composed of three transistors in series, the second voltage regulating unit is composed of four transistors in series, the current detection and amplification circuit adopts the second solution shown in FIG. 5, and the first driving circuit employs the same circuit as the second driving circuit shown in FIG. 3, so as to meet the higher positive high-voltage output requirements; the instruction voltage circuit, the error amplifier, and the voltage feedback circuit are the same as those in Example 2, and a resistor R2A-1 is also added to the emitter circuit of the transistor Q2-1 in the second voltage regulating unit; the remaining portions are the same as those in Example 1.

EXAMPLE 4

Figure 10:
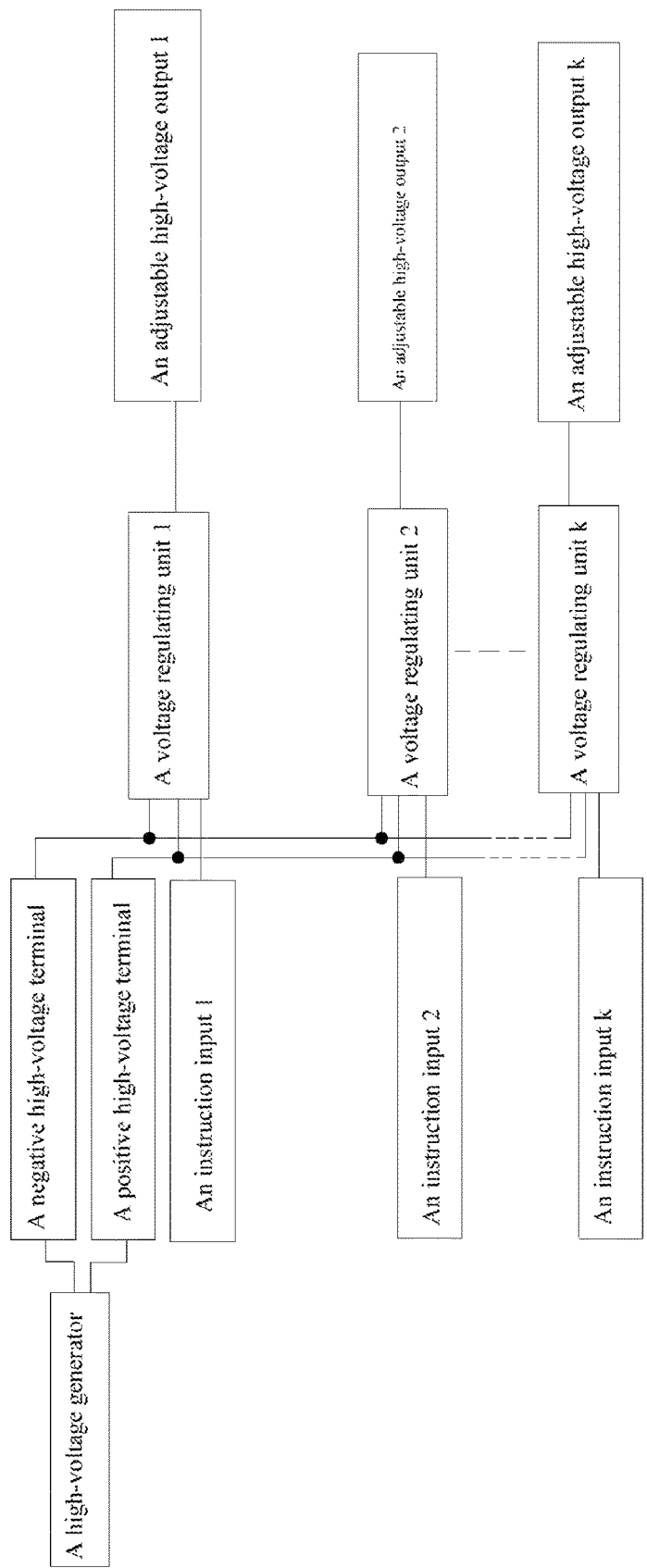
FIG. 10 is a structural schematic view of the wide-range positive-negative adjustable high-voltage DC power supply according to the present invention.

As shown in FIG. 10, in this example, with a common high-voltage generator cooperating with a plurality of groups of the voltage regulating units, the multi-channel independent wide-range positive-negative adjustable DC high-voltage output can be obtained; the configuration of the respective voltage regulating units is the same as that in Example 1.

The above examples are preferred embodiments of the present invention; however, the embodiments of the present invention are not limited thereto, and any other modification, amendment, replacement, combination and simplification not departing from the spirit and principle of the present invention shall be the equivalent permutation, and all fall within the scope of protection of the present invention.

What is claimed is:

1. A wide-range positive-negative adjustable high-voltage DC power supply, comprising a high-voltage generator, a negative high-voltage terminal, a positive high-voltage terminal, a first driving circuit, a first voltage regulating unit, a current detection and amplification circuit, a second driving circuit, a second voltage regulating unit, and an adjustable high-voltage output terminal; as well as an instruction input terminal, an instruction voltage circuit, an error amplifier and a voltage feedback circuit; wherein the high-voltage generator is respectively connected to the positive high-voltage terminal and the negative high-voltage terminal, the positive high-voltage terminal is connected to the input terminal of the first voltage regulating unit, the negative high-voltage terminal is connected to the input terminal of the second voltage regulating unit, the output terminal of the first voltage regulating unit is connected to the output terminal of the second voltage regulating unit and then to the adjustable high-voltage output terminal, the output terminal of the first driving circuit is connected to the driving terminal of the first voltage regulating unit, the current detection terminal of the first voltage regulating unit is connected to the detection input terminal of the current detection and amplification circuit, the output terminal of the current detection and amplification circuit is connected to the input terminal of the second driving circuit, and the output terminal of the second driving circuit is connected to the driving terminal of the second voltage regulating unit; the first voltage regulating unit and the second voltage regulating unit cooperate in a push-pull mode; the instruction input terminal, the instruction voltage circuit and the error amplifier are connected in turn, wherein the output terminal of the error amplifier is connected to the input terminal of the first driving circuit, the input terminal of the voltage feedback circuit is respectively connected to the output terminal of the first voltage regulating unit and the output terminal of the second voltage regulating unit, and the output terminal of the voltage feedback circuit is connected to the error amplifier;

wherein the first voltage regulating unit comprises m PNP transistors Q1-1, Q1-2, . . . Q1-m, m+1 resistors R1-0, R1-1, R1-2, . . . R1-m, and one Zener diode D1-1; the first voltage regulating unit also comprises an input terminal, an output terminal, a current detection terminal and a driving terminal; wherein m≥1 and m is an integer; collectors and emitters of the m PNP transistors are connected to each other in series in turn, wherein the emitter of the first PNP transistor Q1-1 is connected to the anode of the Zener diode D1-1, the cathode of the Zener diode D1-1 is connected to one electrode of the current detection terminal of the first voltage regulating unit, the other electrode of the current detection terminal is connected to the input terminal of the first voltage regulating unit, one terminal of the resistor R1-0 is connected to one electrode of the driving terminal of the first voltage regulating unit, the other electrode of the driving terminal is connected to the input terminal of the first voltage regulating unit, the other terminal of the resistor R1-0 is connected to the base of the PNP transistor Q1-1, the two terminals of the resistor R1-m are respectively connected to the base and collector of the PNP transistor Q1-m, the collector of the PNP transistor Q1-m is also connected to the output terminal of the first voltage regulating unit, and the remaining m-1 resistors are respectively connected across the bases of the m transistors connected in series in turn.

2. The wide-range positive-negative adjustable high-voltage DC power supply according to claim 1, wherein the second voltage regulating unit comprises n NPN transistors Q2-1, Q2-2, . . . Q2-n, n+1 resistors R2-0, R2-1, R2-2, . . . R2-n, and one Zener diode D2-1; the second voltage regulating unit also comprises an input terminal, an output terminal and a driving terminal; wherein n≥1 and n is an integer; collectors and emitters of the n NPN transistors are connected to each other in series in turn, wherein the emitter of the first transistor Q2-1 is connected to the cathode of the Zener diode D2-1, the anode of the Zener diode D2-1 is connected to the input terminal of the second voltage regulating unit, one terminal of the resistor R2-0 is connected to one electrode of the driving terminal of the second voltage regulating unit, the other electrode of the driving terminal is connected to the input terminal of the second voltage regulating unit, the other terminal of the resistor R2-0 is connected to the base of the NPN transistor Q2-1, the two terminals of the resistor R2-n are respectively connected to the base and collector of the transistor Q2-n, the collector of the transistor Q2-n is also connected to the output terminal of the second voltage regulating unit, and the remaining n-1 resistors are respectively connected across the bases of the n transistors connected in series in turn.

3. The wide-range positive-negative adjustable high-voltage DC power supply according to claim 1, wherein the first driving circuit comprises one transistor Q3-1 and five resistors R3-1, R3-2, . . . R3-5, as well as an input terminal and an output terminal; the emitter of the transistor Q3-1 is connected to one terminal of the resistor R3-1, the other terminal of the resistor R3-1 is connected to one electrode of the input terminal of the first driving circuit, the base of the transistor Q3-1 is respectively connected to one terminal of the resistors R3-2 and R3-3, the other terminals of the resistors R3-2 and R3-3 are respectively connected to two electrodes of the input terminal of the first driving circuit, the collector of the transistor Q3-1 is connected to one terminal of the resistor R3-4, the other terminal of the resistor R3-4 is connected to one electrode of the output terminal of the first driving circuit, and the two terminals of the resistor R3-5 are respectively connected to two electrodes of the output terminal of the first driving circuit.

4. The wide-range positive-negative adjustable high-voltage DC power supply according to claim 1, wherein the second driving circuit comprises an optocoupler U4-1 and a resistor R4-1, as well as an input terminal and an output terminal; the anode of a light-emitting diode in the optocoupler U4-1 is connected to one terminal of the resistor R4-1, the other terminal of the resistor R4-1 is connected to one electrode of the input terminal of the second driving circuit, the cathode of the light emitting diode is connected to the other electrode of the input terminal of the second driving circuit, and two terminals of a photosensitive tube in the optocoupler U4-1 are respectively connected to two electrodes of the output terminal of the second driving circuit.

5. The wide-range positive-negative adjustable high-voltage DC power supply according to claim 1, wherein the current detection and amplification circuit comprises a transistor Q5-1 and a resistor R5-1, as well as a detection input terminal and an output terminal; wherein the emitter and the base of the transistor Q5-1 are respectively connected to two electrodes of the detection input terminal of the current detection and amplification circuit, the collector of the transistor Q5-1 is connected to one electrode of the output terminal of the current detection and amplification circuit, the other electrode of the output terminal is connected to a reference voltage point, and two electrodes of the resistor R5-1 are respectively connected to the base and the emitter of the transistor Q5-1.

6. The wide-range positive-negative adjustable high-voltage DC power supply according to claim 1, wherein the current detection and amplification circuit comprises an optocoupler U5-1 and an amplifier A5-1, as well as a detection input terminal and an output terminal; wherein two terminals of a light-emitting diode in the optocoupler U5-1 are respectively connected to two electrodes of the detection input terminal of the current detection and amplification circuit, the two terminals of a photosensitive tube in the optocoupler U5-1 are respectively connected to the two input terminals of the amplifier A5-1, and the two output terminals of the amplifier A5-1 are respectively connected to the two electrodes of the output terminal of the current detection and amplification circuit.

7. The wide-range positive-negative adjustable high-voltage DC power supply according to claim 6, wherein a proportional amplifier composed of an operational amplifier LM324 is used in the amplifier A5-1.

8. A method of controlling the wide-range positive-negative adjustable high-voltage DC power supply according to claim 1, comprising the following steps:
    step 1: producing positive and negative high voltages through the high-voltage generator, wherein the positive and negative high voltages are respectively sent to the positive high-voltage terminal and the negative high-voltage terminal, wherein a first voltage value of the positive high-voltage terminal is greater than an upper limit value of an output voltage regulation range of the wide-range positive-negative adjustable high-voltage DC power supply, and a second voltage value of the negative high-voltage terminal is less than a lower limit value thereof;
    step 2: inputting a PWM voltage regulation instruction by the instruction input terminal;
    step 3: converting the PWM voltage regulation instruction into an instruction voltage by the instruction voltage circuit;
    step 4: comparing and amplifying the instruction voltage with a feedback voltage from the voltage feedback circuit by the error amplifier, sending operation results to the first driving circuit, and driving the first voltage regulating unit to adjust the voltage through the first driving circuit;
    step 5: detecting an emitter current of the PNP transistor Q1-1 in the first voltage regulating unit, and amplifying the detection results through the current detection and amplification circuit before sending them into the second driving circuit, and driving the second voltage regulating unit to participate in the voltage regulation through the second driving circuit;
    wherein an amplification factor of the current detection and amplification circuit should satisfy the following conditions:
    if the emitter current of the PNP transistor Q1-1 in the first voltage regulating unit is recorded as $I_1$, which has a maximum value of $I_{1M}$, then:
    when $I_1 \geq 0.1 I_{1M}$, the NPN transistor Q2-1 in the second voltage regulating unit is driven to enter an off state;
    when $0 < I_1 < 0.1 I_{1M}$, the NPN transistor Q2-1 in the second voltage regulating unit is driven to enter an amplification region to participate in the voltage regulation; and
    when $I_1 = 0$, the emitter current of the NPN transistor Q2-1 in the second voltage regulating unit is driven to reach its maximum value;
    step 6: sampling and feeding back to the error amplifier the output voltage of the wide-range positive-negative adjustable high-voltage DC power supply by the voltage feedback circuit, comparing the output voltage with the instruction voltage, and controlling the output voltage to meet the instruction requirements after operation by the error amplifier.

* * * * *